United States Patent
Randall et al.

(10) Patent No.: US 8,086,667 B1
(45) Date of Patent: Dec. 27, 2011

(54) PROVIDING ACCESS TO MANAGED CONTENT IN RICH CLIENT APPLICATION ENVIRONMENTS

(75) Inventors: Craig Randall, Pleasanton, CA (US); Jerzy Gruszka, Fremont, CA (US)

(73) Assignee: EMC Corporation, Hopkinton, MA (US)

( * ) Notice: Subject to any disclaimer, the term of this patent is extended or adjusted under 35 U.S.C. 154(b) by 1114 days.

(21) Appl. No.: 11/392,313

(22) Filed: Mar. 28, 2006

(51) Int. Cl.
*G06F 15/16* (2006.01)
*G06F 17/30* (2006.01)

(52) U.S. Cl. ........... 709/203; 709/218; 709/220; 707/9; 707/10

(58) Field of Classification Search ............... 709/203, 709/206, 227, 224, 228; 707/10; 715/765
See application file for complete search history.

(56) References Cited

U.S. PATENT DOCUMENTS

| | | | |
|---|---|---|---|
| 6,253,188 B1 * | 6/2001 | Witek et al. | 705/14.54 |
| 6,725,426 B1 * | 4/2004 | Pavlov | 715/205 |
| 6,957,186 B1 * | 10/2005 | Guheen et al. | 705/323 |
| 7,171,411 B1 * | 1/2007 | Lewis et al. | 1/1 |
| 7,260,543 B1 | 8/2007 | Saulpaugj et al. | |
| 7,376,907 B2 * | 5/2008 | Santoro et al. | 715/765 |
| 7,505,978 B2 * | 3/2009 | Bodin et al. | 707/10 |
| 7,603,349 B1 * | 10/2009 | Kraft et al. | 1/1 |
| 7,653,569 B1 * | 1/2010 | Zbib | 707/780 |
| 7,707,249 B2 * | 4/2010 | Spataro et al. | 709/205 |
| 2002/0065849 A1 * | 5/2002 | Ferguson et al. | 707/513 |
| 2003/0187956 A1 | 10/2003 | Belt et al. | |
| 2005/0080801 A1 * | 4/2005 | Kothandaraman et al. | 707/100 |
| 2006/0053196 A1 * | 3/2006 | Spataro et al. | 709/205 |
| 2007/0192684 A1 * | 8/2007 | Bodin et al. | 715/513 |
| 2007/0214149 A1 * | 9/2007 | Bodin et al. | 707/10 |

* cited by examiner

*Primary Examiner* — Khanh Dinh
(74) *Attorney, Agent, or Firm* — Van Pelt, Yi & James LLP

(57) ABSTRACT

Providing access to managed content in rich client application environments is disclosed. A request is received from within a first application environment for access to managed content not managed primarily by a first application with which the first application environment is associated. Access is provided to managed content based at least in part on a context data associated with the first application environment.

20 Claims, 9 Drawing Sheets

PROVIDING ACCESS TO MANAGED CONTENT IN RICH CLIENT APPLICATION ENVIRONMENTS

BACKGROUND OF THE INVENTION

In the computer environment, the context within which access to managed content is provided may determine which content comprising a body of managed content is relevant and/or permitted to be accessed, which content management functionality is able or desired to be made available for such content, and how such content and/or functionality is exposed and/or presented. For example, sometimes the context is a general computation environment whereas some other times the context is an application environment (e.g., a computer aided design environment, a spreadsheet environment, a word processing environment, a document publishing environment, etc.). However, content management systems typically require exiting another environment in order to access content management services and functionality or to provide access from another environment in a poorly integrated and/or not fully context aware manner. It would be beneficial to be able to access managed content and associated content management services and functionality in a manner that takes into consideration the context of the environment in which such access is provided.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing application context-aware access to managed content is disclosed. A request is received for access to managed content from within a first application environment. Access to managed content is provided to an extent and/or in a manner determined based at least in part on the first application environment. In some embodiments, application connectors enable access to services (e.g., content management services) within a rich application environment (e.g., client application pull down menu access from a word processing application such as Microsoft Office Word™, a spread sheet application such as Microsoft Office Excel™, a publishing application such as Adobe Acrobat™, Pagemaker™, or Framemaker™, a computer aided design application, a database application, a financial management application such as Intuit Quicken™, etc.). Application connectors understand transitions, remember last states, and emulate environments (e.g., regional, personal preference and language settings), to make the user experience seamless. A combination of client and server software enable a request-response type interaction to properly interact with a rich application environment on the client side and the application services provided on the application server.

Figure 1:
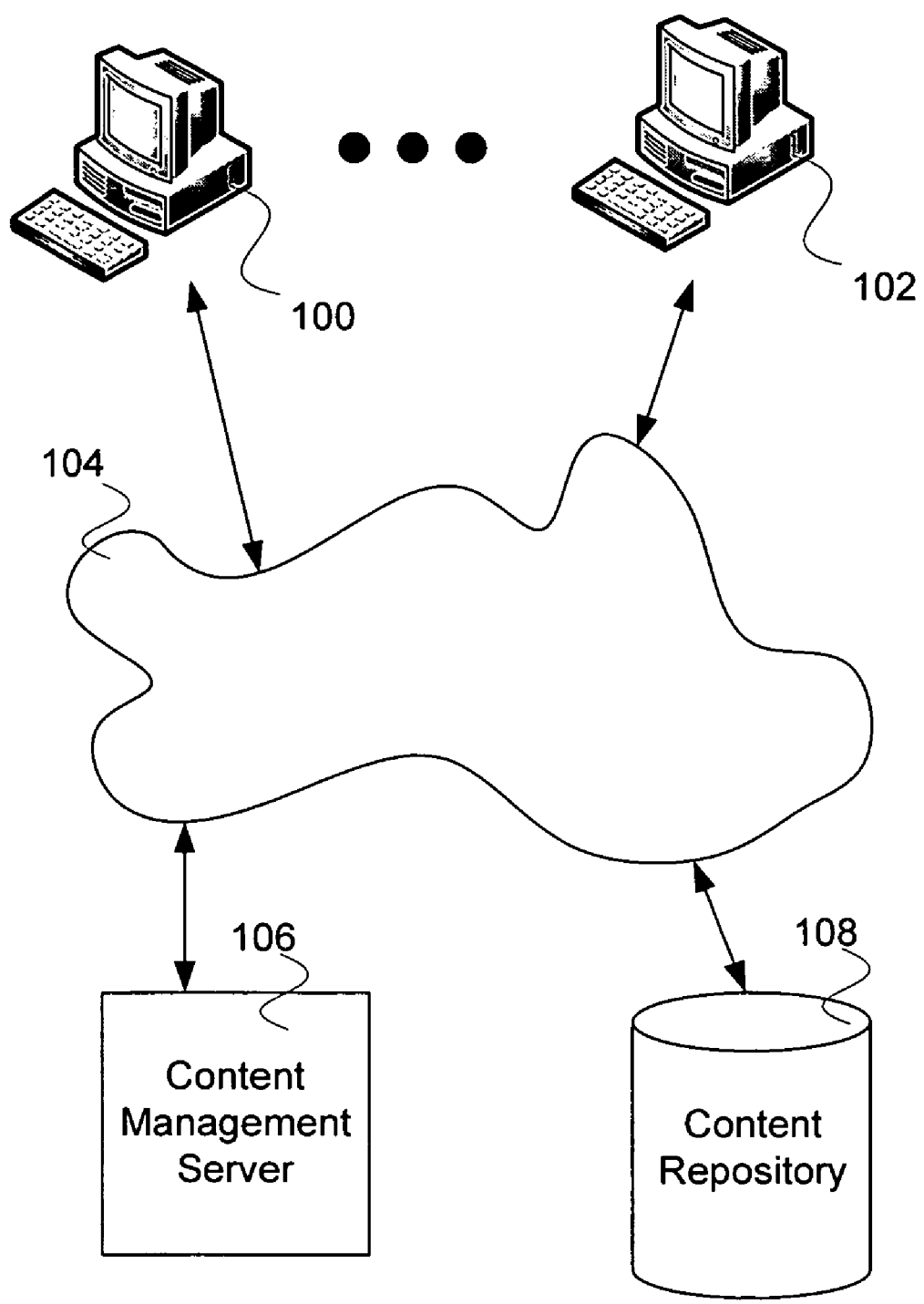
FIG. 1 is a block diagram illustrating an embodiment of a content management system.

FIG. 1 is a block diagram illustrating an embodiment of a content management system. In the example shown, a computer or terminal, such as one of those represented in FIG. 1 by the computers 100 and 102, is used to interact with a content management system. Computers 100 and 102 are coupled to network 104 and interact via network 104 with content management server 106 and content repository 108 comprising the content management system. In various embodiments, network 104 includes one or more of the Internet, a local area network, a wide area network, a wired network, a wireless network, and any other network that can enable a user to access stored system content. Content management server 106 includes applications and/or services that are used when accessing content stored in repository 108. Content management server 106 also includes applications used for creating, maintaining, and interacting with application connectors. An application connector allows a user, while in an application environment that is not the content management application environment, such as a client application running on a client such as client 100 or client 102, to access services and functionality of the content management system from inside the application environment in a manner that is consistent with the application environment (e.g., menus appear as if they are a part of the application environment and follow regional and other system and user preference settings). In some embodiments, content management server 106 comprises an application server. In various embodiments, content management server 106 comprises one or more processors, one or more memories, and one or more storage devices and can be implemented using one or more physical box units. In various embodiments, repository 108 comprises one or more storage devices and/or one or more processors or one or more memories and can be implemented using one or more physical box units. In some embodiments, content management server 106 and repository 108 are combined in one physical unit or system.

Figure 2:
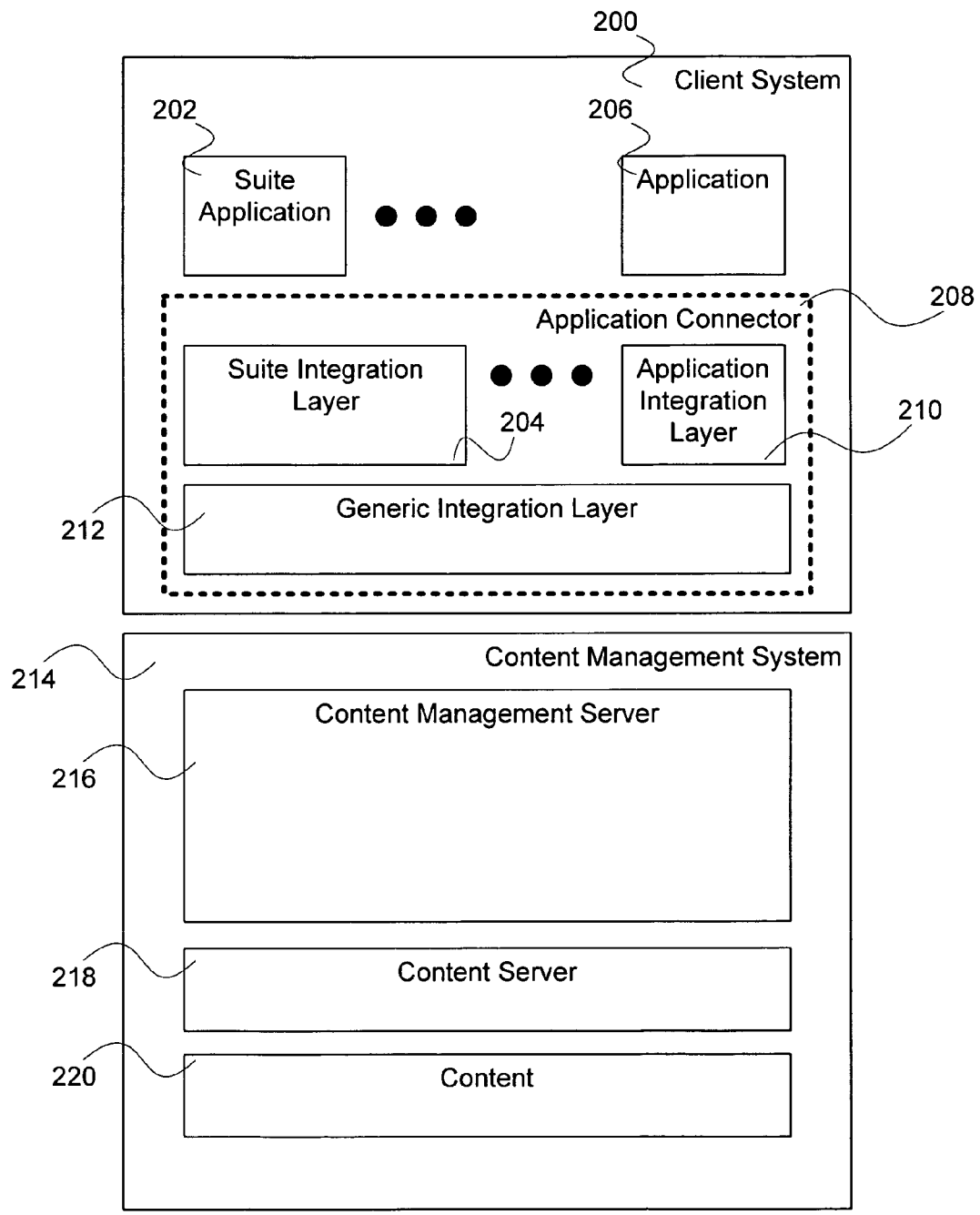
FIG. 2 is a block diagram illustrating an embodiment of a system with applications connected with a content management system.

FIG. 2 is a block diagram illustrating an embodiment of a system with applications connected with a content management system. In some embodiments, client system 200 corresponds to a client system such as computers 100 and 102 of Figure, and content management system 214 corresponds to content management server 106 and content repository 108. In the example shown, client system 200 includes applications, represented in FIG. 2 by suite application 202 and application 206, and application connector 208. Applications comprise executable software that manipulate, create, and/or destroy content within an application environment. Suite applications comprise an executable set of software that manipulate, create, and/or destroy content within an application environment that are designed to have common interfaces and/or access points. Application connectors enable a user to access content, services, and/or functionality from/to the content management system from within a non-content management application in a manner that is determined at least in part by the application environment. In various embodiments, an application connector performs one or more of the following: translating between a communication format and/or interface associated with the application, on the one hand, and a communication format and/or interface associated with the content management system, on the other; recognizing and responding appropriately to transitions and other events in the application environment; providing to the content management system a context data indicating a context or state of the application environment; providing to the application environment and/or a host on which the application is running a presentation data usable to determine how to present or expose managed content and/or content management service and/or functionality in the application environment (e.g., menu style or theme; user preferences as defined in application context; how to display in a rich client environment a user interface designed originally for web/browser access); providing access within the application environment to managed content in a manner that reflects a state of the managed content system with respect to such content, e.g., not presenting "check in" or "cancel check out" as an option for an item of content currently checked out to another user; and other operations required to provide integrated and application-context aware access to managed content from within another application environment.

In the example shown, application connector 208 includes suite and application integration layers, represented in FIG. 2 by suite integration layer 204 and application integration layer 210, and generic integration layer 212. Generic integration layer 212 comprises the translation between content management system 214 and specific application and/or suite integration layers such as suite integration layer 204 and/or application integration layer 210. In some embodiments, generic integration layer 212 translates in a generic manner between the content management system interface and common elements of content authoring applications/suites, such as menu form and content, commands, and operations common to authoring applications/suites. Suite integration layers translate between the generic integration layer and a suite of applications. In some embodiments, each application within a suite may require a further application integration layer (not shown) to translate between the suite integration layer and the individual application itself. Application integration layer 210 translates between the generic integration layer and applications. Providing one or more levels of indirection through generic integration layer 212 and/or suite integration layers such as suite integration layer 204 makes it easier to integrate (i.e., develop connectors for) new applications and requires less work to adjust to changes in the interface at either end (content management system vs. suite/application).

Content management system 214 includes content management server 216, content server 218, and content 220. In various embodiments, content management server 216 provides content management services, such as retention services, storage services (e.g., fetching and storing), search services (e.g., full text search), version control services (e.g., checking in and/or checking out), security policy services, work flow services, business process services, and/or any other appropriate content management services. Content management server 216 communicates with content server 218. Content server 218 provides access to content 220.

Figure 3:
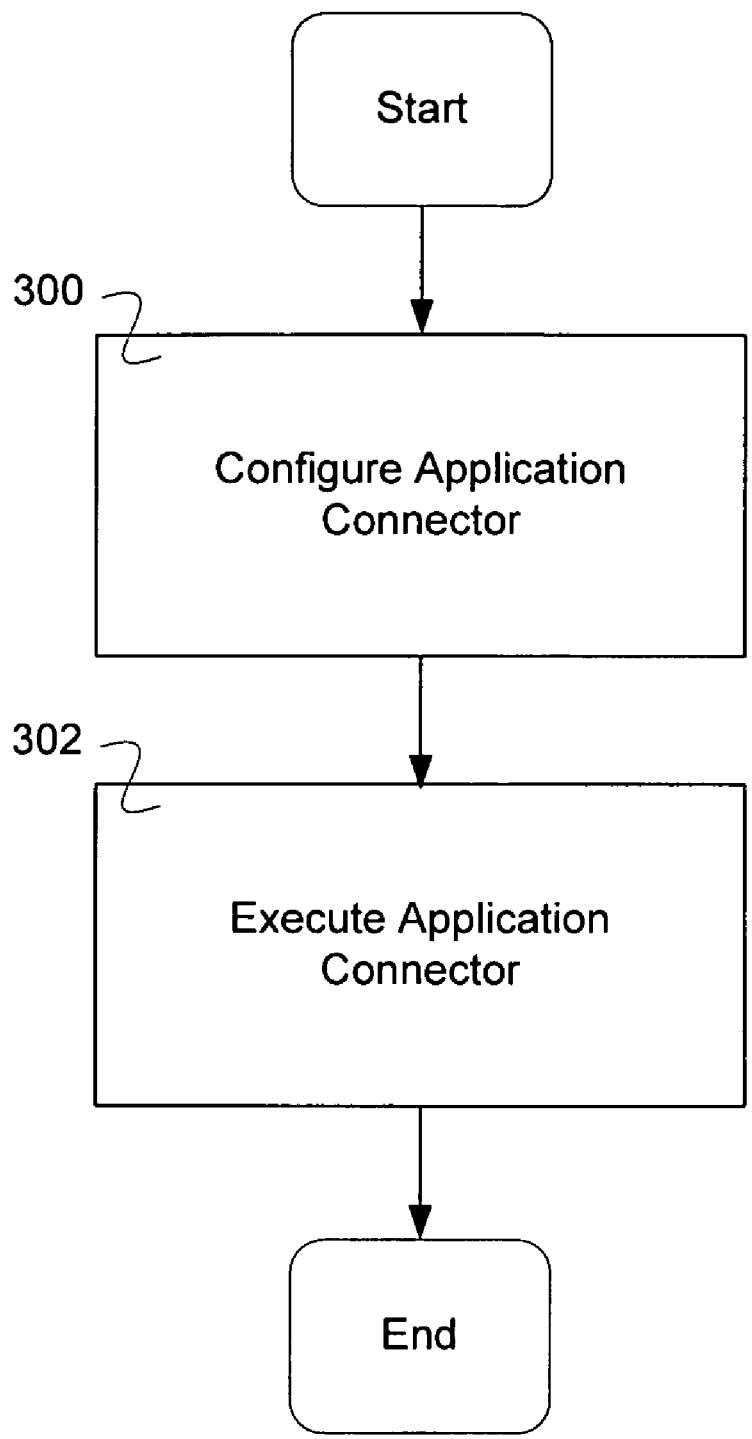
FIG. 3 is a flow diagram illustrating an embodiment of a process for providing an application connector.

FIG. 3 is a flow diagram illustrating an embodiment of a process for providing an application connector. In some embodiments, the process of FIG. 3 is implemented in a client computer system such as computer 100 or 102 of FIG. 1 and/or as part of client system 200 of FIG. 2. In the example shown, in 300 an application connector is configured. An application connector or suite application connector is configured such that content management functionality and/or services are provided to the user appearing as if the functionality and/or services are provided by the application itself—for example, the environmental rules (e.g., locale service settings, regional settings, language settings, display characteristics, etc.) are followed for displaying command options (e.g., menu command items are presented in a similar style to a menu for the application). In addition, transition and state information is saved such that the interaction with the content management system appears as if the content management system behaves as the application environment typically does. In some embodiments, interactions with the content management system are query-response based in XML and the application connector translates the desired functionality between the application and the content management system into the appropriate query-response XML to communications. In 302, an application connector is executed. In some embodiments, if a change happens in an environmental setting during execution, then the application connector updates its interaction with the application to align itself with the change in the setting. In some embodiments, the alignment with the change in a setting includes downloading new interaction parameters from the content management server (e.g., new menu entries/settings are down loaded if a new language or region setting is set for the application).

Figure 4:
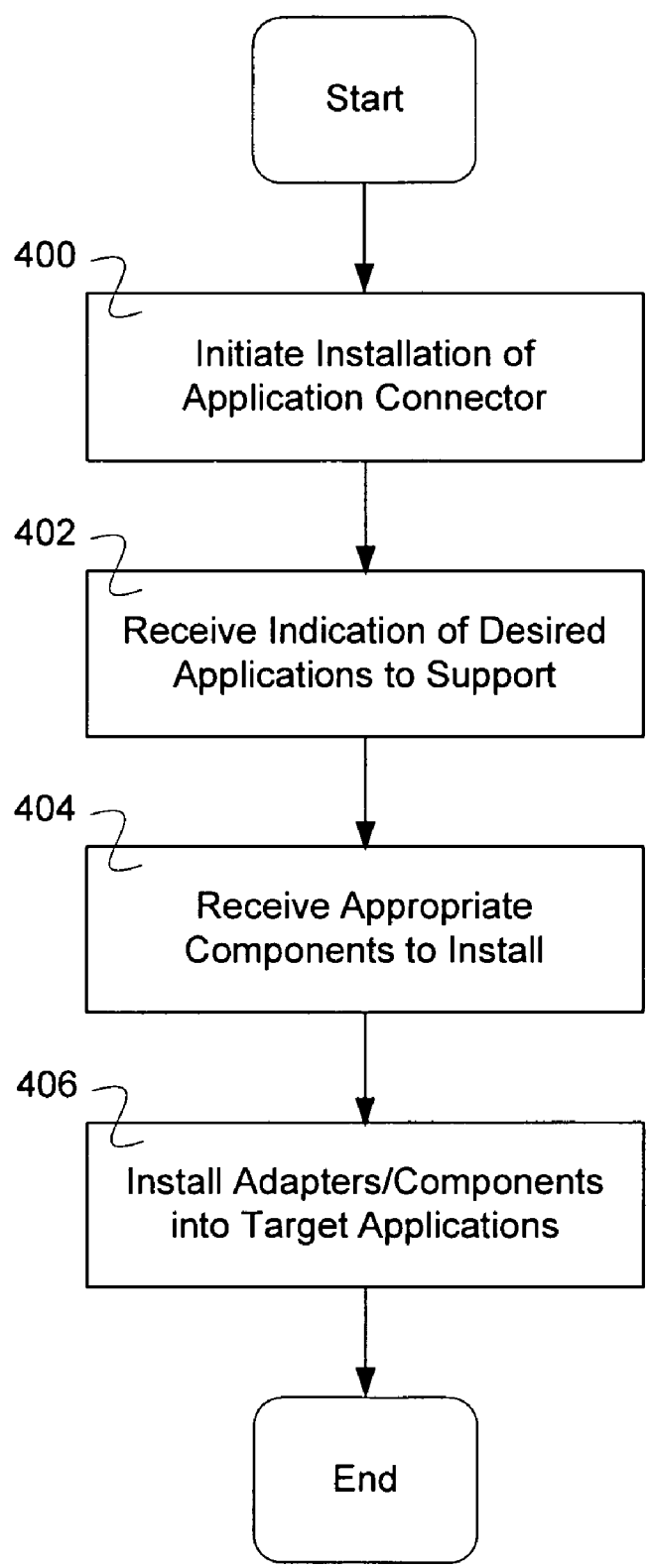
FIG. 4 is a flow diagram illustrating an embodiment of a process for configuring an application connector.

FIG. 4 is a flow diagram illustrating an embodiment of a process for configuring an application connector. In some embodiments, the process of FIG. 4 is used to implement 300 of FIG. 3. In the example shown, in 400 installation of an application connector is initiated. In various embodiments, a system administrator initiates an application connector installation in a client system, a user initiates the need to install an application connector in a client system, or a content management system application initiates the installation of an application connector in attached client systems. In 402 an indication of desired applications to support is received. In various embodiments, the client system, the user, and/or the content management system indicate desired applications to support in the client system. In 404, appropriate components to install are received. In some embodiments, the content management server application downloads components based on the desired applications to support to the client. Components include generic integration layer, application integration layer(s), and/or suite integration layer(s). In some embodiments, the components include for each application to be supported a menu definition file (e.g., XML file) to be used by an associated application connector and/or component thereof and/or client side service associated therewith on the client side to indicate to the content management system what access to managed content is required and to translate and display responsive data received from the content management system. In 406, adapters/components are installed into target applications. Components are installed on client system and interact with target applications and ultimately handle interactions between the target applications and the content management system. In some embodiments, installation onto target application comprises installing application or suite integration layers on the client system.

Figure 5:
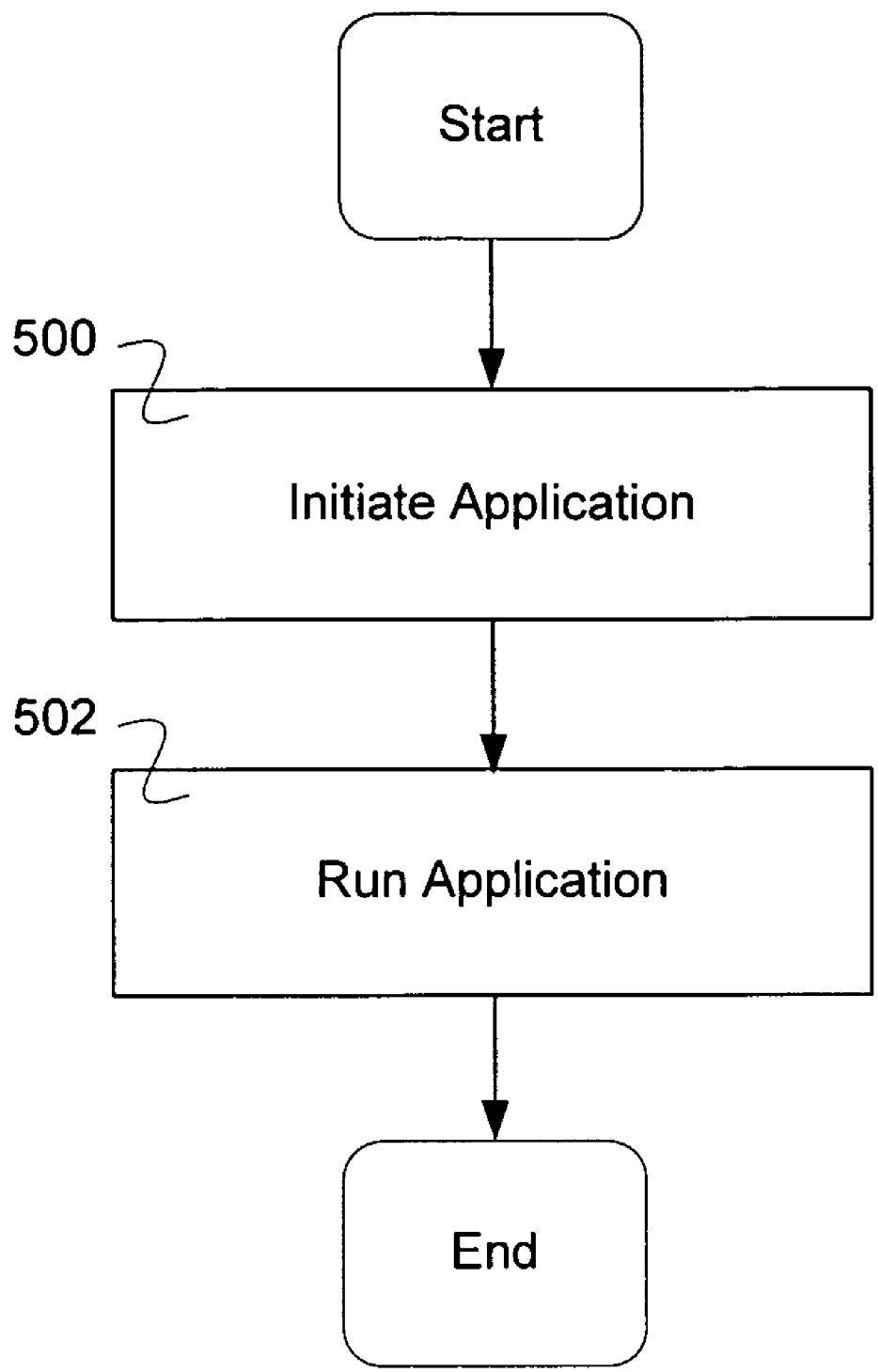
FIG. 5 is a flow diagram illustrating an embodiment of a process for executing an application connector.

FIG. 5 is a flow diagram illustrating an embodiment of a process for executing an application connector. In some embodiments, the process of FIG. 5 is used to implement 302 of FIG. 3. In the example shown, in 500 an application is initiated. Initiation process checks to see if the content management system is available. If the system is available, then information is accessed in order to present content management services and functionality that is available to the user in the application environment, e.g., based on the application and/or a current state of the application, and/or the content requested and/or a state of such content within the content management system. In 502, an application is run. During the execution of the application, a user can select a command to execute that requests a service or functionality from the content management system. The content management system is made available in the context of the application environment and is presented in a manner that is compatible with the regional or locale preferences or other environmental configurations. For example, regional preferences may include European spelling, monetary, or measurement unit preferences; personal preferences may include font styles, font colors, background colors, view preferences for directories (e.g., small icons, large icons, list with or without details, thumbnails, tree view, tiled view, etc.), directory or icon placement and/or size preferences, menu style (e.g., simple, full, advanced, etc.), etc. In some embodiments, the preferences or environment settings are stored in a configuration file associated with the application or with the operating system. The command that requests the service or functionality comprises selecting a menu item, a button press, entering a command in a text box, or any other appropriate method of requesting a service.

Figure 6:
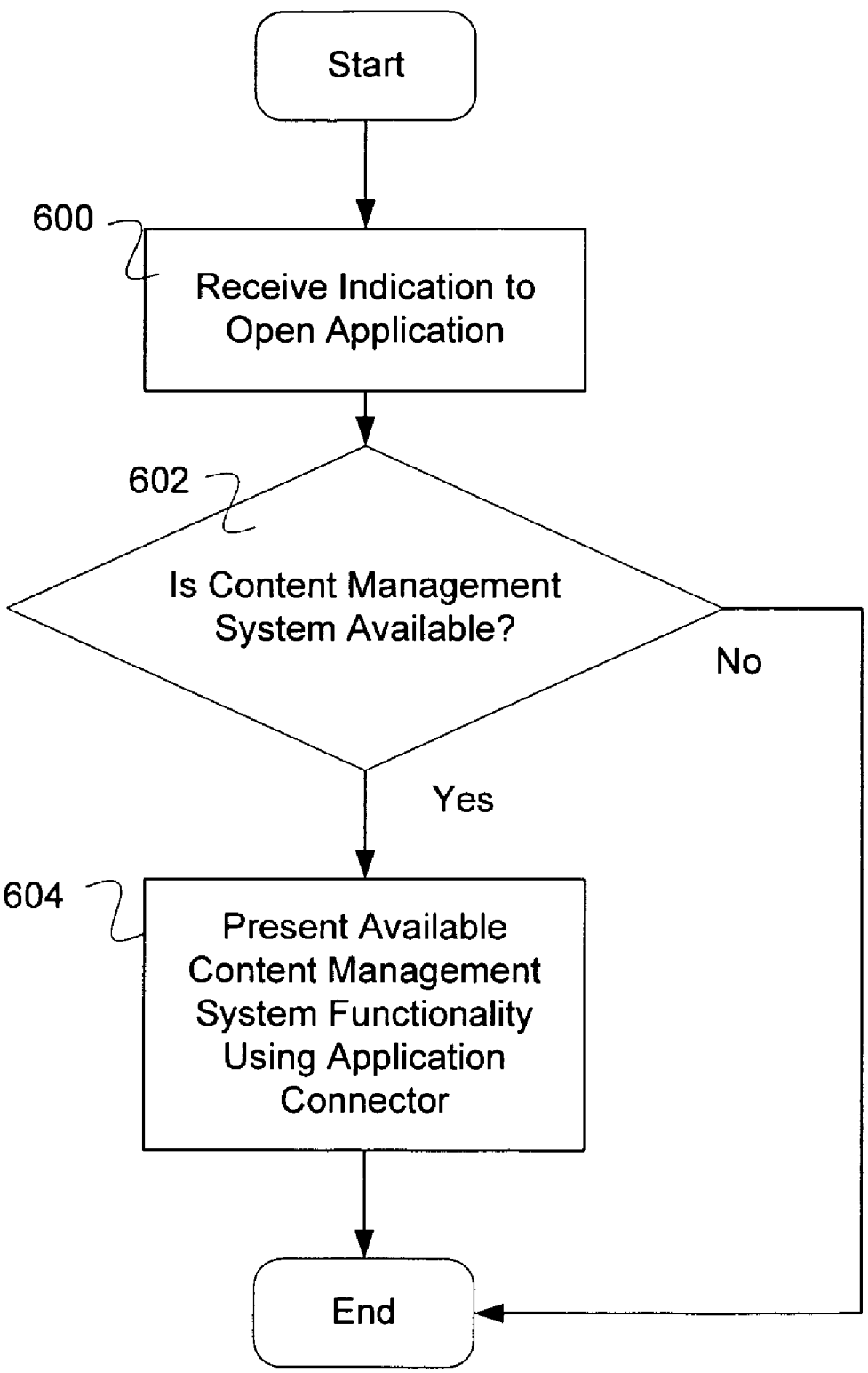
FIG. 6 is a flow diagram illustrating an embodiment of a process for initiating an application.

FIG. 6 is a flow diagram illustrating an embodiment of a process for initiating an application. In some embodiments, the process of FIG. 6 is used to implement 500 of FIG. 5. In the example shown, in 600 an indication is received to open an application. In 602, it is determined if a content management system available. If a content management system is available, then in 604 available content management functionality is presented using an application connector. In some embodiments, the functionality is presented by having menu options that offer the available services and functionality of the content management system. In some embodiments, the state of availability of the service and/or functionality is updated and reflected in the menu presentation as the state changes (e.g., a content item that is not available to be opened is grayed out in the menu). In some embodiments, the state of availability of a service/functionality from the content management system is changed by another application (e.g., a file is checked out by another client application, so it is indicated as being unavailable to other applications) or by the content management system (e.g., by users using the content, an application using the content, or the system requiring the content, etc.). If a content management system is not available, then the process ends.

Figure 7:
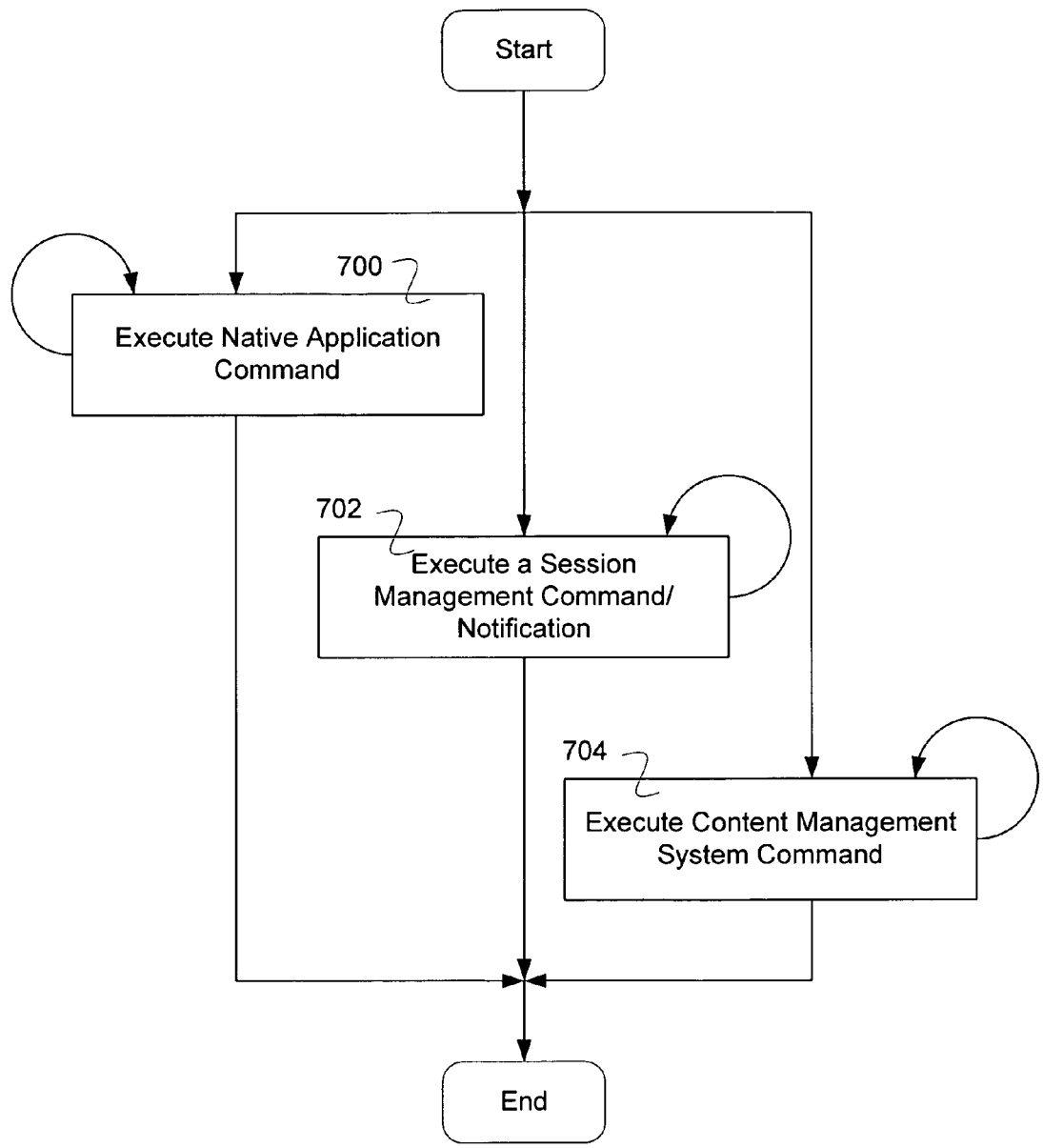
FIG. 7 is a flow diagram illustrating an embodiment of a process for running an application.

FIG. 7 is a flow diagram illustrating an embodiment of a process for running an application. In some embodiments, the process of FIG. 7 is used to implement 502 of FIG. 5. In the example shown, in 700 a native application command is executed. For example, any standard application command is executed within the application. There is no required interaction with the content management system or with the application connector. In 702, a session management command is executed. The session management commands include opening a session with a content management system, renewing a session, terminating a session. In some embodiments, a session between a user operating in an application and a content management system is authenticated via an application connector. The session is maintained by the application connector when configured appropriately so that the user experience is integrated with the application environment. For example, if configured to maintain the content management session while the application is open (e.g., while the client application is executing), the session manager in some embodiments will respond to notices of impending termination from the content management system (e.g., timeout notifications and/or keep alive reminders) by automatically re-authorizing the session. In some embodiments, the application connector stores credential information and uses such information to renew/maintain a session with the content management system in a manner that is transparent to the user. In some embodiments, the application manager intercepts and responds to such a notification without causing/allowing it to be displayed to the user. If configured not to maintain the session, the application connector will allow the session with the content management system to terminate. In some embodiments, the user is required to re-authenticate for auditing purposes, and in such embodiments the user is prompted, by operation of the application connector, to enter within the application environment the required authentication data. In 704, a content management system command is executed. A content management system command is selected from within an application environment. In various embodiments, a command is issued to the content management system using a menu selection, a button press, entering a command in a text box, or any other appropriate method for indicating a command.

Figure 8:
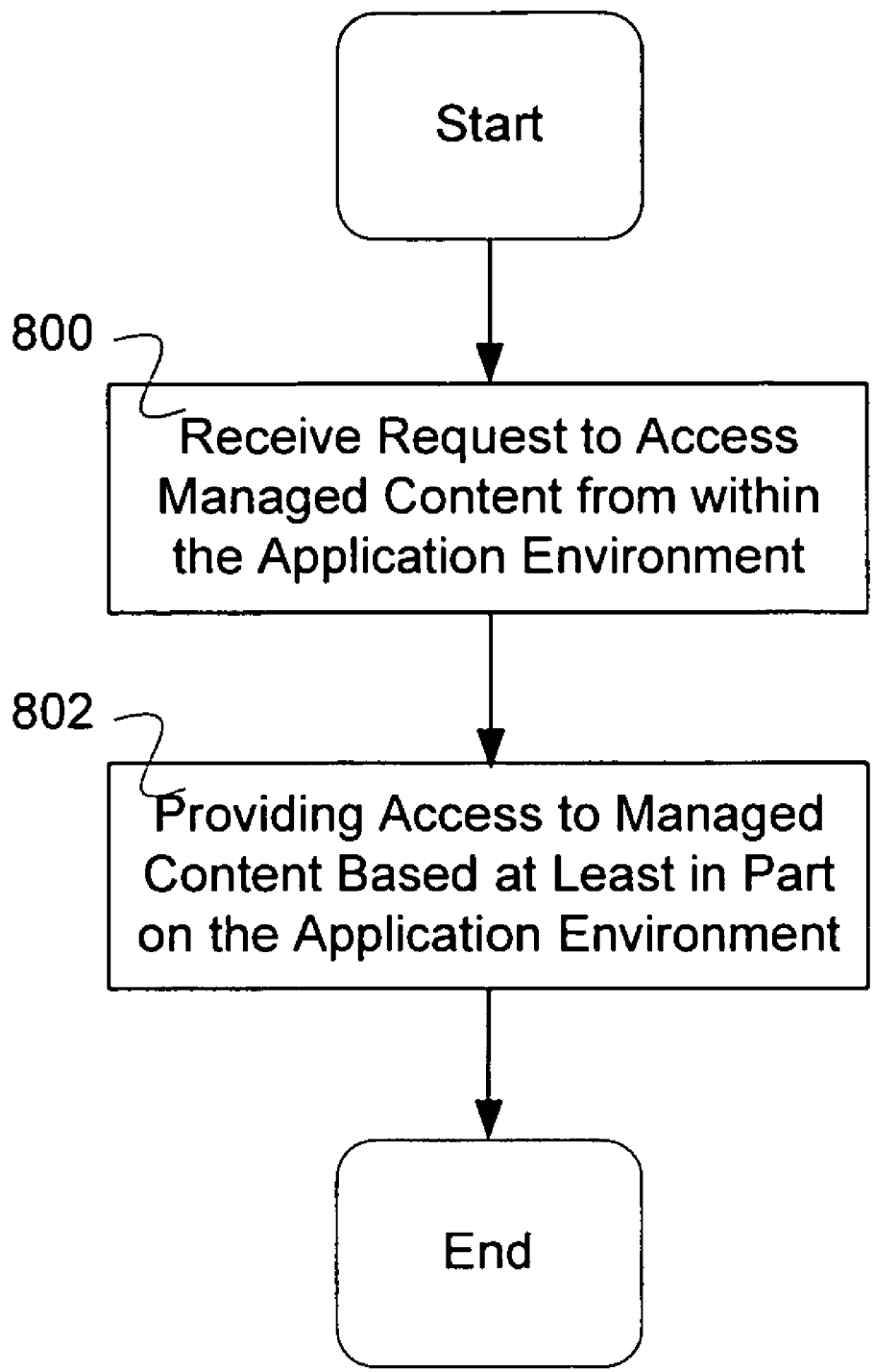
FIG. 8 is a flow diagram illustrating an embodiment of a process for executing a content management system command.

FIG. 8 is a flow diagram illustrating an embodiment of a process for executing a content management system command. In some embodiments, the process of FIG. 8 is used to implement 704 of FIG. 7. In the example shown, in 800 a request is received to access managed content from within an application environment. For example, a request is received to fetch a file. In 802, access is provided to the managed content from within the application environment. For example, a navigation dialog box is presented to the user displaying possible files that can be fetched from the content management system. The user selects a file and this information is transmitted to the content management system. The client computer system receives an event indication that the requested file is available and the location of the requested file. The requested file is then opened and made available for the application. In some embodiments, the content management system provides instructions to the application connector and the application connector listens for the instructions.

Instructions are carried out on the client in order to enable the user to experience an application environment compatible access to content management system services and functionality. In some embodiments, an agent or service on the client responds to requests from within the application environment to access managed content by providing to the content management system a lightweight communication comprising a data indicating a desired action or operation, e.g., an action name associated with a menu selection or other user input and/or a context data indicating a context within which the action was requested. An action service at the content management system interprets the request and provides to the client a response that includes a result of the requested action (e.g., a content item; a query result; a navigation pane; a list of folder contents; etc.) and XML or other data to be used by the client to present the result in a manner determined at least in part by comparing the XML or other data with a menu or other definition/configuration file on (e.g., previously downloaded to and/or installed on) the client side. In some embodiments, the application connector is configured to respond to events originated by the content management system. For example, in some embodiments a request to browse content results in a series of navigation panes being sent by the server and displayed by the client/application connector. If an item of content is requested to be retrieved, in some embodiments the request is relayed by the client/application connector to the server for processing—i.e., the client does not interpret and process the request and instead relays it to the server. The server separately downloads the content to the client host and generates an event instructing the client to open and display in the client application environment, e.g., for viewing and/or editing, the content item as stored locally on the client.

Figure 9:
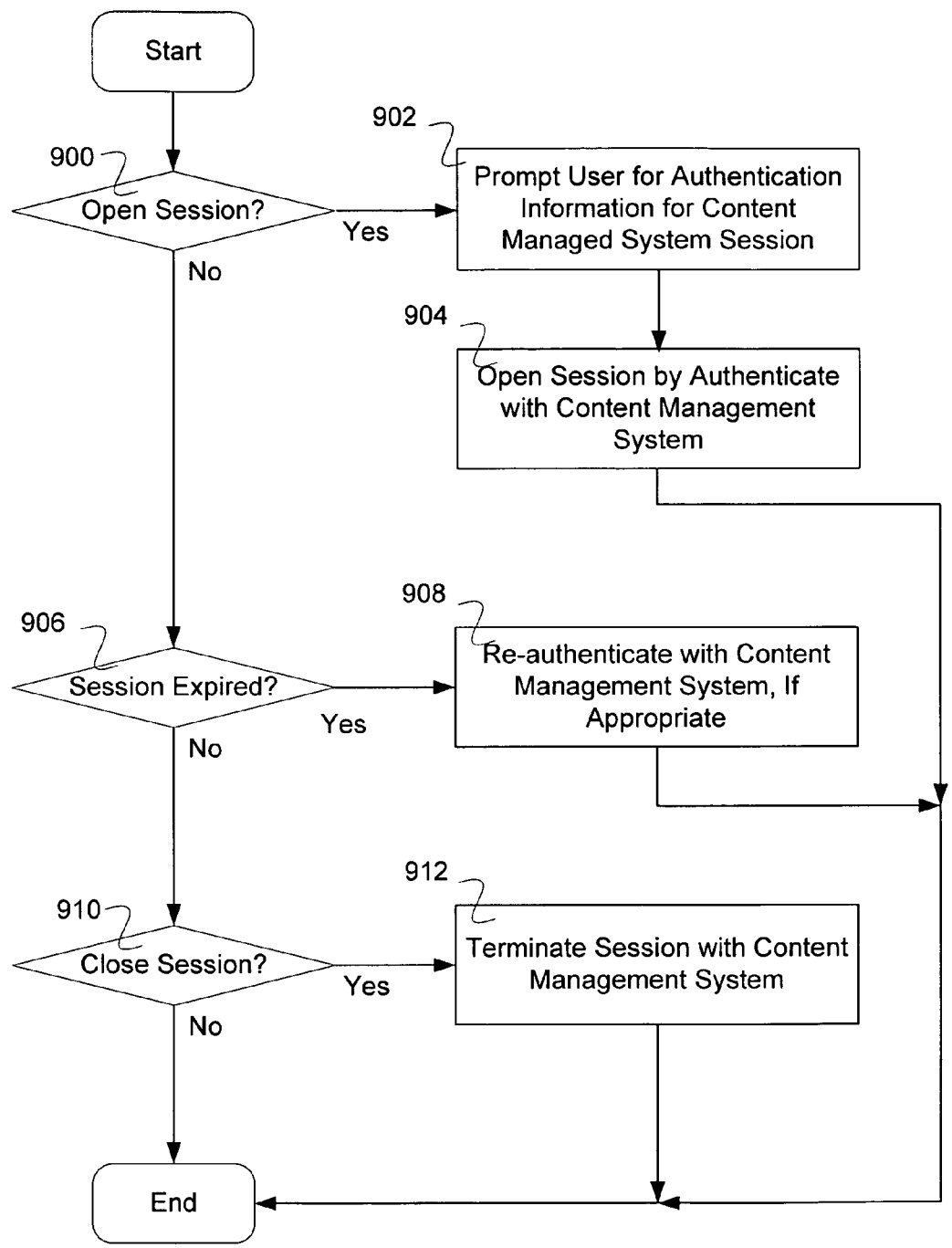
FIG. 9 is a flow diagram illustrating an embodiment of a process for executing a session management command.

FIG. 9 is a flow diagram illustrating an embodiment of a process for executing a session management command. In some embodiments, the process of FIG. 9 is used to implement 702 of FIG. 7. In the example shown, in 900, it is determined if opening a session is requested. If opening a session is requested, then in 902 a user is prompted within the client application environment to enter within that environment authentication information for the content management system session. In 904 a content management system session is opened by authenticating with the content management system. If opening a session is not requested, then in 906 it is determined if a previously opened session has expired with the content management system. If the session has expired, then in 908 if appropriate the session is re-authenticated with the content management system. The session manager can be configured to re-authenticate the session with the content management system for as long as the application is open (e.g., client application is executing), as long as the client operating system session is open or executing (e.g., a Microsoft Windows™ session is open), and/or any other appropriate boundary for maintaining a session (e.g., based on time or other event), or to not maintain the session—for example, if for auditing purposes it is required that a user re-authenticates after a certain time period by the user physically entering a credential or other data used to authenticate. If the session has not expired, then the 910 it is determined if closing a session is requested. If closing a session is requested, then in 912 the session is terminated with the content management system. If closing a session is not requested, then process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for managing content, comprising:
receiving from within a first application environment a request for access to managed content not managed primarily by a first application with which the first application environment is associated, wherein the first application environment is associated with a client system, wherein the first application accesses managed content from a menu and wherein the first application comprises a word processing application, a spread sheet application, a database application, or a publishing application; and
providing access to managed content associated with a content management system based at least in part on a context data associated with the first application environment, wherein providing access to managed content includes translating the request for access to managed content into an interaction configured to cause the content management system to send content associated with the request to the client system and to generate at least instructions associated with accessing the sent content, wherein a state associated with the first application environment is remembered and emulated during the process of providing access to managed content, and wherein providing access includes indicating an availability associated with the requested access to managed content.

2. A method as in claim 1, wherein the managed content is managed by a content management system.

3. A method as in claim 1, wherein the request for access comprises a request that a content management system service or function be performed.

4. A method as in claim 1, wherein the request comprises one of the following: selecting a menu item, a button press, or entering a command in a text box.

5. A method as in claim 1, wherein access comprises one or more of the following: full text searching, querying, browsing, fetching, storing, checking in, or checking out.

6. A method as in claim 1, wherein access is based at least in part on a state within the content management system of a content item comprising the managed content.

7. A method as in claim 6, wherein the state within the content management system of the content item wherein the state of the content is determined at least in part by an action performed with respect to the content item by one or more of the following: a second client application, a content management application, and a content management system user.

8. A method as in claim 1, wherein the first application environment comprises a rich client application environment and a content management application used to provide access to the managed content comprises a web-based or other browser-based application.

9. A method as in claim 1, wherein the context data comprises one or more of the following: regional settings, language settings, or personal preference settings.

10. A method as in claim 1, wherein the first application comprises one of the following: a client application, a content authoring application, a word processing application, a spreadsheet application, a publishing application, a computer aided design application, a database application, and a financial management application environment.

11. A method as in claim 1, wherein providing access to managed content based at least in part on a context data associated with the first application environment comprises displaying in a menu style associated with the first application environment a menu that includes one or more content management functions, services, or both.

12. A computer program product for managing content, the computer program product being embodied in a computer readable non-transitory medium and comprising computer instructions for:

receiving from within a first application environment a request for access to managed content not managed primarily by a first application with which the first application environment is associated, wherein the first application environment is associated with a client system, wherein the first application accesses managed content from a menu and wherein the first application comprises a word processing application, a spread sheet application, a database application, or a publishing application; and providing access to managed content associated with a content management system based at least in part on a context data associated with the first application environment, wherein providing access to managed content includes translating the request for access to managed content into an interaction configured to cause the content management system to send content associated with the request to the client system and to generate at least instructions associated with accessing the sent content, wherein a state associated with the first application environment is remembered and emulated during the process of providing access to managed content, and wherein providing access includes indicating an availability associated with the requested access to managed content.

13. A system for managing content comprising:
a processor; and a memory coupled with the processor, wherein the memory is configured to provide the processor with instructions which when executed cause the processor to:

receive from within a first application environment a request for access to managed content not managed primarily by a first application with which the first application environment is associated, wherein the first application environment is associated with a client system, and wherein the first application accesses managed content from a menu and wherein the first application comprises a word processing application, a spread sheet application, a database application, or a publishing application; and provide access to managed content associated with a content management system based at least in part on a context data associated with the first application environment, wherein to provide access to managed content includes to translate the request for access to managed content into an interaction configured to cause the content management system to send content associated with the request to the client system and to generate at least instructions associated with accessing the sent content, wherein a state associated with the first application environment is remembered and emulated during the process of providing access to managed content, and wherein providing access includes indicating an availability associated with the requested access to managed content.

14. A system as in claim 13, wherein the request comprises one of the following: selecting a menu item, a button press, or entering a command in a text box.

15. A system as in claim 13, wherein access comprises one or more of the following: full text searching, querying, browsing, fetching, storing, checking in, or checking out.

16. A system as in claim 13, wherein access is based at least in part on a state within the content management system of a content item comprising the managed content.

17. A system as in claim 13, wherein the first application environment comprises a rich client application environment and a content management application used to provide access to the managed content comprises a web-based or other browser-based application.

18. A system as in claim 13, wherein the context data comprises one or more of the following: regional settings, language settings, or personal preference settings.

19. A system as in claim 13, wherein the first application comprises one of the following: a client application, a content authoring application, a word processing application, a spreadsheet application, a publishing application, a computer aided design application, a database application, and a financial management application environment.

20. A system as in claim 13, wherein providing access to managed content based at least in part on a context data associated with the first application environment comprises displaying in a menu style associated with the first application environment a menu that includes one or more content management functions, services, or both.

* * * * *